(12) United States Patent
Pawlak

(10) Patent No.: US 10,576,518 B2
(45) Date of Patent: Mar. 3, 2020

(54) CONTAMINANT-EXTRACTION SYSTEM

(71) Applicant: Bogdan Roman Pawlak, Calgary (CA)

(72) Inventor: Bogdan Roman Pawlak, Calgary (CA)

(*) Notice: Subject to any disclaimer, the term of this patent is extended or adjusted under 35 U.S.C. 154(b) by 0 days.

(21) Appl. No.: 15/928,245

(22) Filed: Mar. 22, 2018

(65) Prior Publication Data
US 2018/0207694 A1 Jul. 26, 2018

Related U.S. Application Data

(63) Continuation of application No. 15/156,863, filed on May 17, 2016.

(51) Int. Cl.
*B09C 1/00* (2006.01)
*B09C 1/02* (2006.01)
*G05D 7/06* (2006.01)

(52) U.S. Cl.
CPC .......... *B09C 1/005* (2013.01); *B09C 1/00* (2013.01); *B09C 1/02* (2013.01); *G05D 7/0635* (2013.01); *G05D 7/0676* (2013.01); *B09C 2101/00* (2013.01)

(58) Field of Classification Search
CPC .......... B09C 1/005; B09C 1/02; G05D 7/0635
See application file for complete search history.

(56) References Cited

U.S. PATENT DOCUMENTS

| | | | | |
|---|---|---|---|---|
| 5,118,629 A * | 6/1992 | Quiros | ............ | B09C 1/005 422/62 |
| 5,160,217 A * | 11/1992 | Metzer | ............ | B09C 1/005 405/128.2 |
| 5,161,914 A * | 11/1992 | Rahn | ............ | B09C 1/005 405/128.2 |
| 5,186,255 A * | 2/1993 | Corey | ............ | E21B 34/06 166/250.15 |
| 5,413,129 A * | 5/1995 | Shenoi | ............ | B09B 3/0091 134/102.1 |
| 5,445,474 A * | 8/1995 | Lundegard | ............ | B09C 1/002 405/128.45 |
| 5,509,760 A * | 4/1996 | Schriefer | ............ | B09C 1/002 166/245 |
| 5,584,605 A * | 12/1996 | Beard | ............ | B09C 1/00 166/266 |
| 5,676,207 A * | 10/1997 | Simon | ............ | B09C 1/00 166/266 |
| 6,109,358 A * | 8/2000 | McPhee | ............ | B09C 1/00 166/401 |
| 6,428,694 B1 * | 8/2002 | Brown | ............ | B09C 1/00 210/143 |

(Continued)

*Primary Examiner* — Benjamin F Fiorello
(74) *Attorney, Agent, or Firm* — Ryan W. Dupuis; Ade + Company Inc.; Kyle R. Salterthwaite

(57) ABSTRACT

An apparatus includes a controllable contaminant-extraction system configured to, at least in part, extract an extractable contaminant from a contaminant plume positioned in the soil via an extraction conduit extending in the contaminant plume. A control assembly is configured to control operation of the controllable contaminant-extraction system in such a way that the controllable contaminant-extraction system extracts the extractable contaminant via the extraction conduit by randomly changing, at least in part, a flow rate of the extractable contaminant that is extracted from the contaminant plume.

9 Claims, 4 Drawing Sheets

(56) References Cited

U.S. PATENT DOCUMENTS

| | | | |
|---|---|---|---|
| 2005/0109710 A1* | 5/2005 | Mitarai | B09C 1/00 |
| | | | 210/750 |
| 2008/0008535 A1* | 1/2008 | Ball | B09C 1/002 |
| | | | 405/128.5 |
| 2009/0039031 A1* | 2/2009 | Gustafson | B09C 1/00 |
| | | | 210/747.8 |
| 2010/0239373 A1* | 9/2010 | Gillecriosd | B01D 53/002 |
| | | | 405/128.5 |
| 2012/0107150 A1* | 5/2012 | Pawlak | F04B 17/02 |
| | | | 417/334 |
| 2016/0107911 A1* | 4/2016 | Takada | C02F 3/06 |
| | | | 210/252 |

* cited by examiner

CONTAMINANT-EXTRACTION SYSTEM

This application is a continuation of U.S. parent application Ser. No. 15/156,863, filed May 17, 2016.

TECHNICAL FIELD

This document relates to the technical field of (and is not limited to) a process (method) and apparatus including a controllable contaminant-extraction system and a control assembly configured to control the operation of the controllable contaminant-extraction system (and method related thereto).

BACKGROUND

Soil vapor extraction (SVE) is a physical treatment process for in situ remediation of volatile contaminants in soils. SVE is also referred to as in situ soil venting or vacuum extraction. SVE is based on the mass transfer of contaminant from the solid and/or liquid (aqueous or non-aqueous) phases into the gas phase, with subsequent collection of the gas phase contamination at extraction wells. For instance, extracted contaminant mass in the gas phase (or any condensed liquid phase) may be treated in aboveground systems, etc. Examples of contaminants may include chlorinated solvents and hydrocarbons, etc.

SUMMARY

It will be appreciated that there exists a need to mitigate (at least in part) at least one problem associated with the existing soil vapor extraction systems (also called the existing technology). After much study of the known systems and methods with experimentation, an understanding of the problem and its solution has been identified and is articulated as follows:

Known soil vapor extraction systems, which operate in accordance with a soil-remediation method, are configured to remove contaminants (such as, hydrocarbons) from soil. The known soil vapor extraction system includes an extraction well, a power source and a vacuum pump that is configured to be powered by the power source. Known soil vapor extraction systems are configured to constantly extract soil vapor from the soil, and are also configured to extract unwanted fluid (contaminant) from the soil. The unwanted fluid (contaminant) is extracted by continuously operating the extraction system. The extraction system creates a predictable rate of decreasing concentration with an area of decreased hydrocarbon concentration surrounding an extraction well. The radius of this area (often referred to as radius of influence) depends on the formation permeability, extraction rate and pump run time, etc. For the method to be effective, the balance between formation permeability and extraction rate has to be established, which in practice is difficult to achieve.

To mitigate, at least in part, at least one problem associated with the existing technology, there is provided (in accordance with a major aspect) an apparatus. The apparatus includes a controllable contaminant-extraction system configured to, at least in part, extract an extractable contaminant from a contaminant plume positioned in the soil via an extraction conduit (preferably, via an entrance portal (such as, a perforated screen) of the extraction conduit) extending in the contaminant plume. A control assembly is configured to control the operation of the controllable contaminant-extraction system in such a way that the controllable contaminant-extraction system extracts the extractable contaminant via the extraction conduit by randomly changing, at least in part, a flow rate of the extractable contaminant that is extracted from the contaminant plume.

To mitigate, at least in part, at least one problem associated with the existing technology, there is provided (in accordance with a major aspect) a method (a process). The method includes extracting, at least in part, an extractable contaminant from a contaminant plume positioned in the soil via an extraction conduit (preferably, via an entrance portal (such as, a perforated screen of the extraction conduit) extending in the contaminant plume by randomly changing, at least in part, a flow rate of the extractable contaminant that is extracted from the contaminant plume.

Other aspects are identified in the claims.

Other aspects and features of the non-limiting embodiments may now become apparent to those skilled in the art upon review of the following detailed description of the non-limiting embodiments with the accompanying drawings.

This Summary is provided to introduce concepts in simplified form that are further described below in the Detailed Description. This Summary is not intended to identify key features or essential features of the disclosed or claimed subject matter, and is not intended to describe each disclosed embodiment or every implementation of the disclosed or claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

DETAILED DESCRIPTION OF THE DRAWINGS

The non-limiting embodiments may be more fully appreciated by reference to the following detailed description of the non-limiting embodiments when taken in conjunction with the accompanying drawings, in which.

Figure 1:
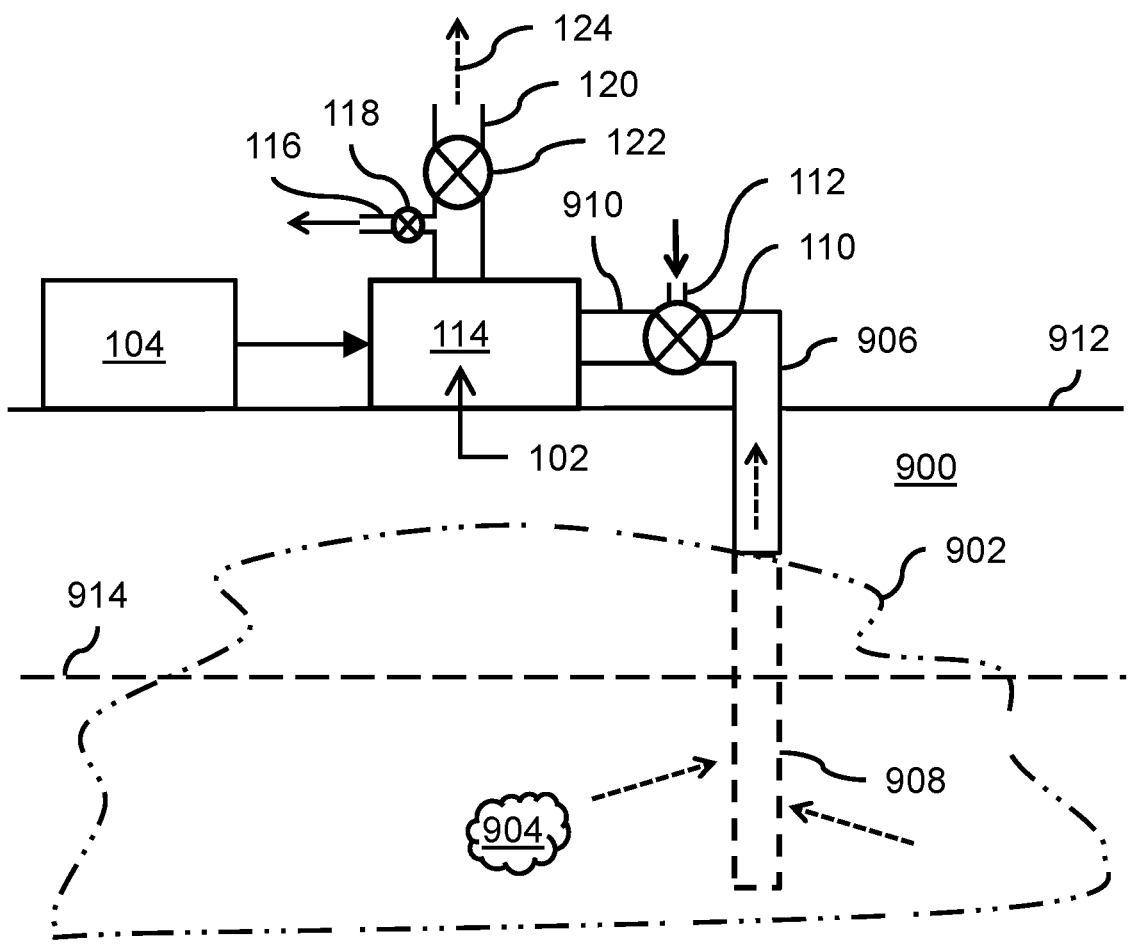
FIG. 1 depicts a side view (schematic view) of an embodiment of an apparatus including a controllable contaminant-extraction system and a control assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 controllable contaminant-extraction system
104 control assembly
106 controllable pump assembly
108 windmill
110 bleeding valve
112 air input
114 centrifugal pump
116 sampling port
118 sampling valve
120 off-gas discharge
122 off-gas discharge valve
124 off-gas flow
126 diaphragm pump
128 flow line
130 flow line
132 flow line
134 flow line
136 flow line
138 limit line
140 horizontal axis
142 vertical axis
900 soil
902 contaminant plume
904 extractable contaminant
906 extraction conduit
908 entrance portal
910 exit portal
912 working surface
914 static water level

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims (in which the claims may be amended during patent examination after filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a side view (schematic view) of an embodiment of an apparatus including a controllable contaminant-extraction system 102 and a control assembly 104.

Figure 2:
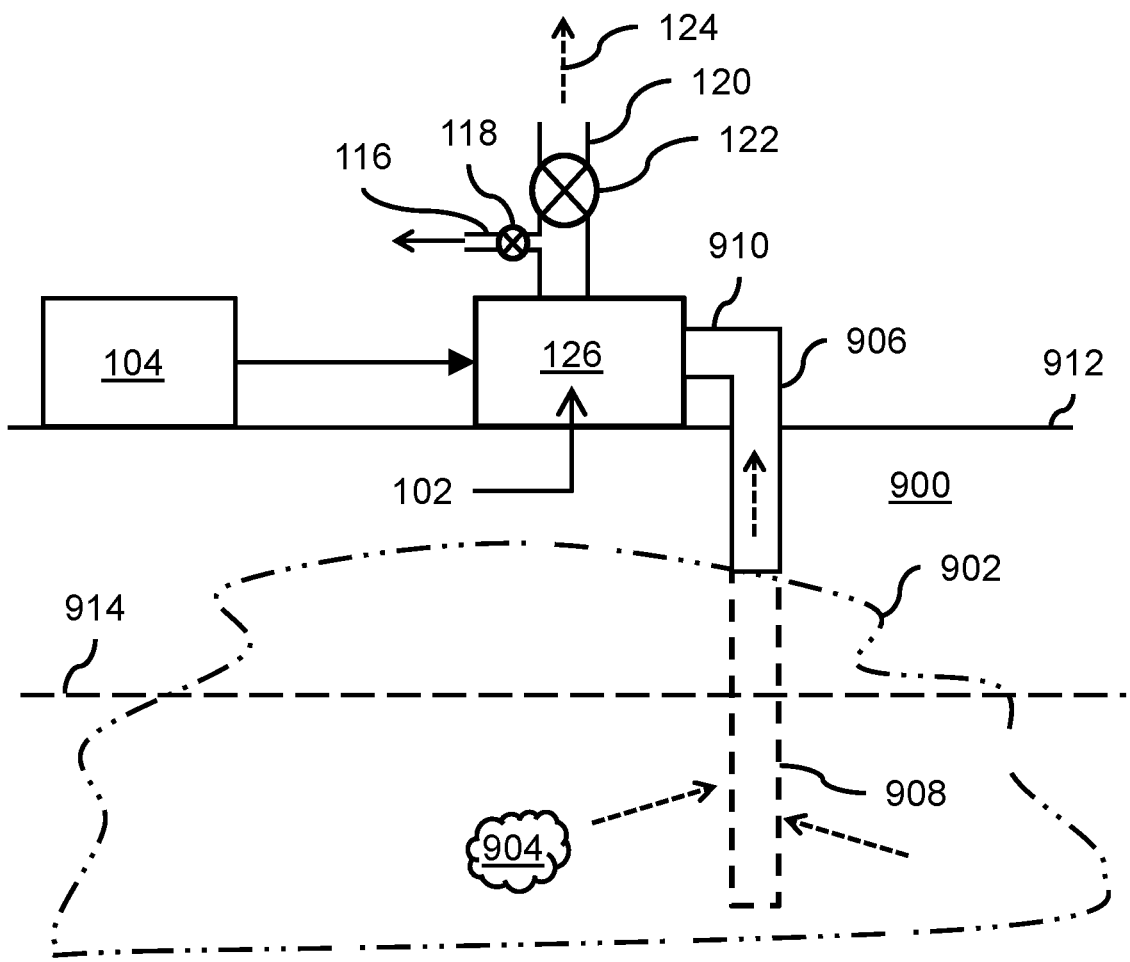
FIG. 2 depicts a side view (schematic view) of an embodiment of the apparatus of FIG. 1.

FIG. 2 depicts a side view (schematic view) of an embodiment of the apparatus of FIG. 1.

With reference to the embodiment as depicted in FIG. 1 and FIG. 2, and in accordance with a first general aspect, the apparatus includes (and is not limited to) a synergistic combination of a controllable contaminant-extraction system 102 and a control assembly 104.

The controllable contaminant-extraction system 102 is configured to, at least in part, extract (either directly or indirectly) an extractable contaminant 904 from a contaminant plume 902. The extractable contaminant 904 may be in any state, such as a liquid, a gas or a flowable solid. For instance, the contaminant plume 902 includes a hydrocarbon plume. The contaminant plume 902 is positioned in the soil 900 (also called a formation). More specifically, the controllable contaminant-extraction system 102 is configured to extract the extractable contaminant 904 from the contaminant plume 902 via an extraction conduit 906. The extraction conduit 906 extends (either directly or indirectly) in the contaminant plume 902. For instance, the extraction conduit 906 includes a well, an extraction well, etc., and any equivalent thereof. The extraction conduit 906 extends (at least in part) past the static water level 914.

The control assembly 104 is configured to control (either directly or indirectly) the operation of the controllable contaminant-extraction system 102. This is done in such a way that the controllable contaminant-extraction system 102 extracts (either directly or indirectly) the extractable contaminant 904 via the extraction conduit 906 by randomly changing (either directly or indirectly), at least in part, a flow rate of the extractable contaminant 904 that is extracted (either directly or indirectly) from the contaminant plume 902.

With reference to the embodiment as depicted in FIG. 1 and FIG. 2, and in accordance with the first general aspect, there is provided a method including (and not limited to) extracting, at least in part, the extractable contaminant 904 from a contaminant plume 902 positioned in the soil 900 via the extraction conduit 906 extending in the contaminant plume 902 by randomly changing, at least in part, a flow rate of the extractable contaminant 904 that is extracted from the contaminant plume 902.

With reference to the embodiment as depicted in FIG. 1 and FIG. 2, and in accordance with a second general aspect, the apparatus includes (and is not limited to) a synergistic combination of a controllable contaminant-extraction system 102 and a control assembly 104.

The controllable contaminant-extraction system 102 is configured to be installed (either directly or indirectly), at least in part, relative to the soil 900 (underground). The contaminant plume 902 is positioned, at least in part, in the soil 900. The contaminant plume 902 includes (and is not limited to) an extractable contaminant 904 located therein (that is, in the contaminant plume 902). For instance, the extractable contaminant 904 includes a hydrocarbon.

The controllable contaminant-extraction system 102 is configured to be operatively coupled (either directly or indirectly) to the extraction conduit 906. The extraction conduit 906 is configured to be installed (either directly or indirectly), at least in part, in the soil 900. This is done in such a way that the extraction conduit 906, in use, extends (either directly or indirectly), at least in part, in the contaminant plume 902 that is positioned in the soil 900.

The extraction conduit 906 includes (and is not limited to) an entrance portal 908 that is configured to be positioned (either directly or indirectly), at least in part, in the contaminant plume 902. This is done in such a way that the extractable contaminant 904, in use, is movable from the contaminant plume 902 and enters (either directly or indirectly) an interior of the extraction conduit 906. It will be appreciated that, in accordance with a preferred embodiment, the entrance portal 908 includes a plurality of spaced apart portals extending along a portion of the extraction conduit 906 that is positioned in the contaminant plume 902. The extraction conduit 906 also includes (and is not limited to) an exit portal 910 that is spaced-apart from the entrance portal 908. The exit portal 910 is configured to allow the extractable contaminant 904 to be movable (either directly or indirectly) from the entrance portal 908 and along the extraction conduit 906 and to exit (either directly or indirectly) from the interior of the extraction conduit 906 away from the soil 900. For example, the exit portal 910 is configured to allow the extractable contaminant 904 to be movable from the entrance portal 908 and along the extraction conduit 906 and to exit from the interior of the extraction conduit 906 to the atmosphere or into a storage system (away from the soil 900).

The controllable contaminant-extraction system 102 is configured to be operatively coupled (either directly or indirectly) to the extraction conduit 906.

The controllable contaminant-extraction system 102 is configured to, at least in part, extract or remove (either directly or indirectly), in use, the extractable contaminant 904 from the contaminant plume 902 via the extraction conduit 906. This is done once (A) the extraction conduit 906 is extended (either directly or indirectly), at least in part, in the contaminant plume 902, and (B) the controllable contaminant-extraction system 102 is operatively coupled (either directly or indirectly) to the extraction conduit 906. It will be appreciated that there is no specific order of (A) and (B).

The control assembly 104 is configured to be operatively connected (either directly or indirectly) to the controllable contaminant-extraction system 102. This is done in such a way that the control assembly 104, in use, controls (either directly or indirectly) the operation of the controllable contaminant-extraction system 102.

The control assembly 104 is configured to control (either directly or indirectly) the controllable contaminant-extraction system 102. This is done in such a way that the controllable contaminant-extraction system 102 operates (either directly or indirectly) to extract or remove the extractable contaminant 904 contained in the contaminant plume 902 via the extraction conduit 906.

The control assembly 104, in use, urges the controllable contaminant-extraction system 102 to randomly change, at least in part, a flow rate of the extractable contaminant 904 being extracted (either directly or indirectly) from the contaminant plume 902. The result is that a concentration of the extractable contaminant 904 contained in the contaminant plume 902 is reduced, at least in part. The meaning of random is an operation that is made, done, happens or is chosen without method or conscious decision or is unexpected. It will be appreciated that for some embodiments, the control assembly 104 includes a programmable logic controller (and any equivalent thereof), and for other embodiments, the control assembly 104 does not include a programmable logic controller.

In accordance with a preferred embodiment, the control assembly 104 is further configured to control, in use, the operation of the controllable contaminant-extraction system 102. This is done in such a way that the controllable contaminant-extraction system 102, in use, cycles or alternates between a rest-operation mode and a runtime-operation mode. The meaning of cyclic is a process that occurs in cycles or is recurrent (whether periodically or non-periodically recurrent). The cycles include runtimes and resting times. Alternatively, this is done in such a way that the controllable contaminant-extraction system 102, in use, randomly cycles or alternates between the rest-operation mode and the runtime-operation mode. The rest-operation mode includes time in which the controllable contaminant-extraction system 102 is made to operate. The runtime-operation mode includes time in which the controllable contaminant-extraction system 102 is made to not operate. The meaning of random cyclic is a process that occurs in cycles or is recurrent in a random manner. The cycles may include random runtimes that extend for random periods of time and/or may occur randomly at different times, and resting times that may extend for random periods of time (a time duration) and/or may occur randomly at different times (start time and stop time).

In accordance with a preferred embodiment, during the runtime-operation mode, the control assembly 104, in use, controls the controllable contaminant-extraction system 102. This is done in such a way that the controllable contaminant-extraction system 102 operates to remove or extract the extractable contaminant 904 contained in the contaminant plume 902 via the extraction conduit 906. This is done by randomly changing, at least in part, the flow rate of the extractable contaminant 904 that is removed from the contaminant plume 902 so that a concentration of the extractable contaminant 904 contained in the contaminant plume 902 is reduced, at least in part.

In accordance with a preferred embodiment, during the rest-operation mode, the control assembly 104, in use, controls the controllable contaminant-extraction system 102. This is done in such a way that (A) the controllable contaminant-extraction system 102 does not operate to extract the extractable contaminant 904, and (B) the amount of the extractable contaminant 904 contained in the contaminant plume 902 increases or recovers, at least in part.

In accordance with a preferred embodiment, during the runtime mode, the control assembly 104, in use, controls the controllable contaminant-extraction system 102. This is done in such a way that the controllable contaminant-extraction system 102 operates to remove or extract, at least in part, the extractable contaminant 904 from the contaminant plume 902 via the extraction conduit 906 so that the amount of the extractable contaminant 904 contained in the contaminant plume 902 is decreased, at least in part.

In accordance with a preferred embodiment, the control assembly 104 is further configured to control, in use, the operation of the controllable contaminant-extraction system 102. This is done in such a way that the controllable contaminant-extraction system 102 operates by using variable flow movement of the extractable contaminant 904 (such as by pumping, etc., and any equivalent thereof). The meaning of variable flow movement is process parameters (such as contaminant flow rate, run time and/or contaminant concentration, etc.) are not constant over time and randomly change over the progression of time.

In accordance with a preferred aspect, the variable flow movement is cyclical. The cycles of operation of the controllable contaminant-extraction system 102 include runtimes and resting times (which may occur randomly and/or cyclically).

Resting time is the case where there is zero contaminant flow (or near zero contaminant flow (from the extraction conduit 906) since the controllable contaminant-extraction system 102 is not operational at this time. During the resting times, the soil 900 (the formation) is allowed or permitted to rest and the contaminant concentration recovers (increases).

Runtime is the case where there is contaminant flow from the extraction conduit 906 since the controllable contaminant-extraction system 102 is operational at this time. During the runtimes, the soil 900 (the formation) is not allowed or permitted to rest and the contaminant concentration decreases. The controllable contaminant-extraction system 102 resumes operation during the runtimes, and the controllable contaminant-extraction system 102 may extract the extractable contaminant 904 (such as, a gas) with a relatively higher concentration than at the end of the last cycle.

It may be appreciated that the length (duration) of the resting time may have an important implication on the effectiveness of the remedial effort and, in effect, on the duration of the remediation process.

In accordance with a less preferred aspect, the variable flow movement may be achieved by turning the controllable contaminant-extraction system 102 ON and OFF. However, under the ON-OFF mode of operation, the controllable contaminant-extraction system 102 may reduce the above-mentioned issues, but the controllable contaminant-extraction system 102 may not eliminate them entirely.

In accordance with a more preferred aspect, the variable flow movement may be a complex variable flow operation mode, which may be achieved manually or automatically. Given that soil remediation processes have long durations, usually several years (such as from about 10 to about 15 years, etc.), changing the rate of operation of the controllable contaminant-extraction system 102 (such as pump rotation rate, vacuum rate, etc.) manually is impractical, and automation may be a practical option for a manually-driven system.

Figure 4:
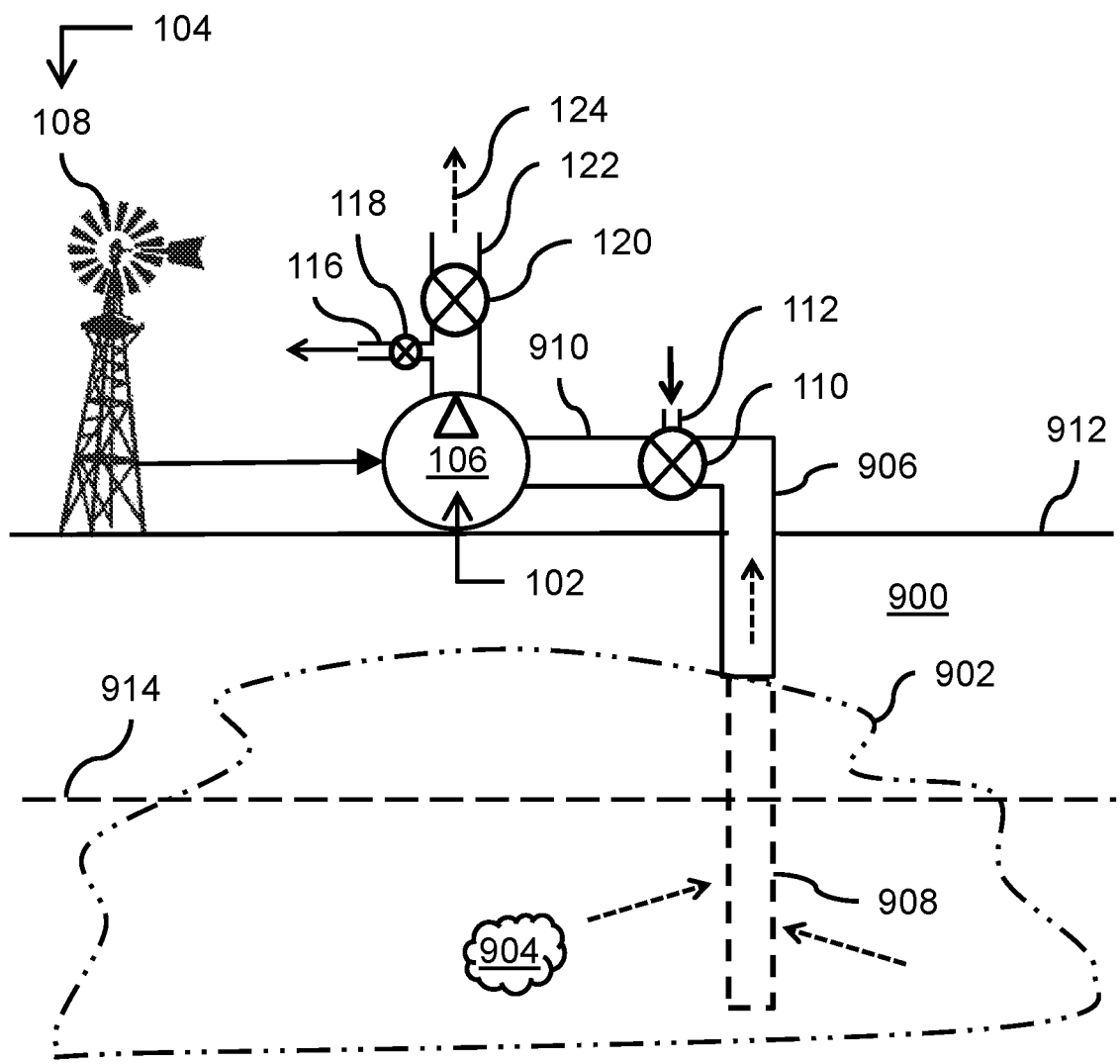
FIG. 4 depicts a side view (schematic view) of an embodiment of the apparatus of FIG. 1.

In accordance with a more preferred aspect, the variable flow movement includes a random variable flow movement by utilizing the wind (as depicted in FIG. 4). Referring to the embodiment as depicted in FIG. 4, the control assembly 104 includes a windmill 108 (also called a wind algorithm). Optionally, power may be generated by the windmill 108 if so desired. The windmill 108 of FIG. 4 may be utilized in (A) the embodiment of FIG. 1 (in which the controllable contaminant-extraction system 102 includes a centrifugal pump 114) or (B) the embodiment of FIG. 2 (in which the controllable contaminant-extraction system 102 includes a diaphragm pump 126). The most preferred embodiment includes the windmill 108 as depicted in FIG. 4 with the diaphragm pump 126 (as depicted in FIG. 2).

Referring to the embodiment as depicted in FIG. 1, the apparatus is configured as an open system (also called, a soil vapor extraction open system or an SVE open system). The controllable contaminant-extraction system 102 is configured to be mounted to (either directly or indirectly, such as a mounting pad) a working surface 912 (also called, ground surface). Preferably, the controllable contaminant-extraction system 102 includes a centrifugal pump 114. The centrifugal pump 114 is a sub-class of dynamic axisymmetric work-absorbing turbomachinery. The centrifugal pump 114 is configured to transport fluids by the conversion of rotational kinetic energy to the hydrodynamic energy of the fluid flow. The rotational energy typically comes from an engine or an electric motor. A fluid enters the pump impeller (known and not depicted) of the centrifugal pump 114 along or near to the rotating axis and is accelerated by the impeller, flowing radially outward into a diffuser or volute chamber (casing), from where the fluid exits.

The apparatus 100 further includes a bleeding valve 110. Preferably, the bleeding valve 110 is mounted proximate to the exit portal 910 of the extraction conduit 906. The bleeding valve 110 is configured to introduce atmospheric air, via an air input 112, into the output section of the extraction conduit 906 (in such a way that atmospheric air is bled, or released, into the input side of the centrifugal pump 114). The centrifugal pump 114 is configured to require a predetermined rate of input fluid flow (volume per unit time), and the bleeding valve 110 is configured to accommodate the rate of fluid flow between the extraction conduit 906 and the centrifugal pump 114 (for the case where the extraction conduit 906 cannot provide sufficient fluid flow to satisfy the fluid-flow requirement of the centrifugal pump 114). The centrifugal pump 114 may require to pass (flow) a predetermined volume of fluid for pump-cooling requirements. The centrifugal pump 114 may operate at a relatively higher revolutions per minute (RPM), and it will be appreciated that the fluid flowing through the centrifugal pump 114 is utilized as a cooling agent for cooling down the centrifugal pump 114.

In accordance with the embodiment as depicted in FIG. 1, the controllable contaminant-extraction system 102 is fluidly coupled to an off-gas discharge 120. The off-gas discharge 120 is configured to vent an off-gas flow 124 to the atmosphere (from the controllable contaminant-extraction system 102, or more specifically, from the centrifugal pump 114). An off-gas discharge valve 122 is fluidly connected to (and in-line with) the off-gas discharge 120. The off-gas discharge valve 122 is configured to generate back pressure in the system (that is, in the extraction conduit 906) to allow flow via the sampling port 116 for off-gas sampling purposes (if so desired).

In accordance with an option, a sampling port 116 extends from, and is fluidly coupled to, the off-gas discharge 120. A sampling valve 118 is fluidly connected to, and in-line with, the sampling port 116. The sampling valve 118 is configured to selectively shut OFF or turn ON fluid flow through the sampling port 116. It will be appreciated that a fluid sample is collected at the sampling port 116. The fluid sample (for the embodiment as depicted in FIG. 1) may not be representative simply because the fluid sample is diluted by clean atmospheric air supplied via the bleeding valve 110. Therefore, any measurement made on the fluid sample may indicate a false positive simply because the fluid concentration is diluted. It will be appreciated that the apparatus 100, as depicted in FIG. 1, is an open system in that the centrifugal pump 114 is configured to take in (receive) air from the atmosphere and from the extraction conduit 906.

Referring to the embodiment as depicted in FIG. 1, the centrifugal pump 114 may require a certain amount of gas (the extractable contaminant 904) to flow through as a cooling agent. If there is not enough gas flowing through the centrifugal pump 114, this may result in an increased internal pump temperature and, if not corrected, may lead to the centrifugal pump 114 becoming over-heated resulting in a shut-down condition (turned off). To correct this problem, the bleeding valve 110 is provided, which introduces atmospheric air to maintain the required volume of gas flowing through the centrifugal pump 114. The bleeding valve 110 provides a process for diluting the extractable contaminant 904 (gas) extracted from the soil 900 at the exit portal 910.

A sampling location for off-gases may be provided at the sampling port 116. It may be appreciated that, at this point, the concentration of the extractable contaminant 904 (such as, hydrocarbon concentration) in the sample collected from the centrifugal pump 114 may be below the laboratory method detection limit and may lead to false conclusions and premature termination of remediation efforts.

Referring to the embodiment as depicted in FIG. 2, the apparatus is configured as a closed system (also called, a soil vapor extraction closed system or an SVE closed system). The controllable contaminant-extraction system 102 includes a diaphragm pump 126. The diaphragm pump 126, generally does not require cooling (but may be cooled if desired). The diaphragm pump 126 (also known as a membrane pump) is a positive displacement pump that uses a combination of the reciprocating action of a diaphragm (rubber, thermoplastic, etc.) and suitable valves on either side of the diaphragm (such as, check valves, butterfly valves, flap valves, or any other form of shut-off valves, etc.) to pump a fluid (such as, a liquid, a gas or a flowable solid). It will be appreciated that for this embodiment (as depicted in FIG. 2), the bleeding valve 110 (as depicted in FIG. 1) is not required.

The fluid sample collected via the sampling port 116 is undiluted (for the embodiment as depicted in FIG. 2) and may therefore be representative. A measurement may be performed on the fluid sample with reasonable measurement accuracy or reliability since the fluid sample is not diluted by the atmosphere (as may be the case for the embodiment as depicted in FIG. 1). A closed system is a system that does not take air from the atmosphere. Preferably, the closed system receives or takes fluid (such as, a gas) entirely from the soil 900.

Referring to the embodiment as depicted in FIG. 2, the diaphragm pump 126 provides flexibility of the membrane (diaphragm) which oscillates creating a vacuum. The diaphragm pump 126, when compared to the centrifugal pump 114 (as depicted in FIG. 1), operates at a relatively slower speed of operation. However, the diaphragm pump 126 does not experience the same overheating problems as the centrifugal pump 114. If the pump stroke rate is set too high for formation permeability, the flexibility of the diaphragm of the diaphragm pump 126 may allow for a "dry run" without generating heat in the diaphragm pump 126. However, this case may lead to an overestimated volume of extracted amounts of the extractable contaminant 904, and may lead to an overestimated system performance.

In accordance with the embodiment as depicted in FIG. 2, the diaphragm pump 126 does not generate heat when working, and so is less likely to overheat. Therefore, there is no need to compensate off-gas volume using the bleeding valve 110 (as depicted in FIG. 1), and therefore it may be an advantage for the embodiment, as depicted in FIG. 4, for driving (operating) the diaphragm pump 126. There may be no need for equalizing pressure or vacuum between the diaphragm pump 126 and the soil 900. There may be less pump overheating with less system down time, and there may be no need for the bleeding valve 110 (as depicted in FIG. 1) between the diaphragm pump 126 and the soil 900. The sample taken from the sampling port 116 represents the real concentration since the off-gas sample is undiluted, and this may allow for better remediation evaluation.

Figure 3:
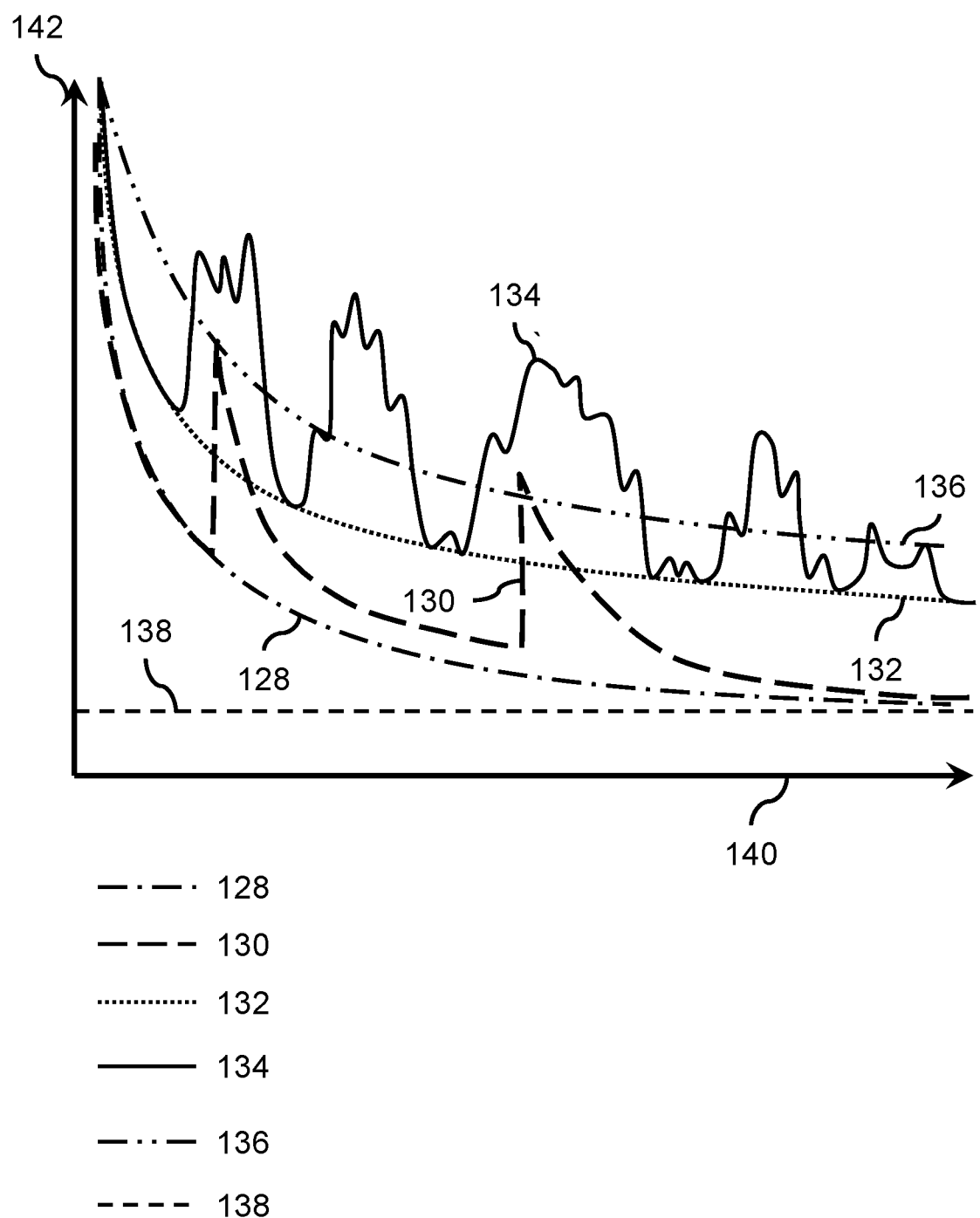
FIG. 3 depicts a side view (schematic view) of the performance of embodiments of the apparatus of FIG. 1.

FIG. 3 depicts a side view (schematic view) of the operational performance of embodiments of the apparatus of FIG. 1.

The horizontal axis 140 represents time. The vertical axis 142 represents concentration. A flow line 128 represents the apparatus of FIG. 1 operating as an open system SVE with a constant flow. A flow line 130 represents the apparatus of FIG. 1 operating as an open system SVE with a variable flow. A flow line 132 represents the apparatus of FIG. 2 operating as a closed system SVE with a constant flow. A flow line 134 represents the apparatus of FIG. 2 operating as a closed system SVE with a variable flow. A flow line 136 represents the apparatus of FIG. 2 operating as a closed system SVE with variable flow average. A limit line 138 represents the laboratory detection limit.

FIG. 4 depicts a side view (schematic view) of an embodiment of the apparatus of FIG. 1.

Referring to the embodiment as depicted in FIG. 4, the controllable contaminant-extraction system 102 includes a controllable pump assembly 106 and any equivalent thereof such as a blower configured to blow air. The control assembly 104 includes a windmill 108 configured to operate the controllable pump assembly 106 in response to movement of the wind. In this manner, during the runtime mode, the controllable pump in direct communication with the extraction conduit operates to directly extract, at least in part, the extractable contaminant from the contaminant plume via the extraction conduit so that an amount of the extractable contaminant contained in the contaminant plume is decreased, at least in part. The windmill of the control assembly is operatively connected to the controllable pump of the controllable contaminant-extraction system so as to be configured to extract the extractable contaminant using the pump in response to movement of the wind.

In accordance with the embodiment as depicted in FIG. 4, the controllable contaminant-extraction system 102 includes a controllable pump assembly 106 (as depicted in FIG. 4), etc., and any equivalent thereof.

In accordance with the embodiment as depicted in FIG. 4, the control assembly 104 includes, for example, a microprocessor controller, programmable logic controller (PLC) configured to simulate a wind algorithm (that is, to simulate the random operation of the wind), or a windmill 108, and/or any equivalent thereof.

It will be appreciated that the description and/or drawings identifies and describes embodiments of the apparatus (either explicitly or non-explicitly). The apparatus may include any suitable combination and/or permutation of the technical features as identified in the detailed description, as may be required and/or desired to suit a particular technical purpose and/or technical function. It will be appreciated, that where possible and suitable, any one or more of the technical features of the apparatus may be combined with any other one or more of the technical features of the apparatus (in any combination and/or permutation). It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope is defined by the claims and not by the written description and/or the drawings. The written description and/or drawings are provided to help understand the scope of the claims. It is believed that all the crucial aspects of the disclosed subject matter have been provided in this document. It is understood that the scope of an invention is provided by the independent claim(s). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method of extracting an extractable contaminant from a contaminant plume in soil, the method comprising:
providing an extraction conduit in the soil such that the extraction conduit extends into the contaminant plume in the soil, in which the extraction conduit includes an entrance portal that is configured to be positioned, at least in part, in the contaminant plume in such a way that the extractable contaminant, in use, is movable from the contaminant plume and enters an interior of the extraction conduit, and in which the extraction conduit also includes an exit portal being spaced-apart from the entrance portal, and the exit portal is configured to allow the extractable contaminant to be movable from the entrance portal and along the extraction conduit and to exit from the interior of the extraction conduit away from the soil;
providing a controllable contaminant-extraction system operatively coupled to the extraction conduit, in which the controllable contaminant-extraction system includes a controllable pump in direct communication with the extraction conduit, the controllable pump being operable between a rest-operation mode in which operation of the controllable pump ceases and a runtime mode in which the controllable pump is operated;
providing a control assembly comprising a windmill operatively connected to the pump of the controllable contaminant-extraction system so as to be configured to cycle the pump between the rest-operation mode and the runtime-operation mode as dictated by movement of the wind;
connecting the controllable pump in direct communication with the extraction conduit such that (i) during the rest-mode operation, an amount of the extractable contaminant contained in the contaminant plume only increases by ceasing to extract the extractable contaminant from the contaminant plume via the extraction conduit and (ii) during the runtime mode, the amount of the extractable contaminant contained in the contaminant plume only decreases by directly extracting the extractable contaminant from the contaminant plume via the extraction conduit using the controllable pump.

2. The method according to claim 1 including controlling the controllable contaminant-extraction system in such a way that the controllable contaminant-extraction system operates to remove the extractable contaminant contained in the contaminant plume via the extraction conduit by randomly changing, at least in part, the flow rate of the extractable contaminant that is removed from the contaminant plume in response to movement of the wind so that the concentration of the extractable contaminant contained in the contaminant plume is reduced, at least in part.

3. The method according to claim 1 including configuring the exit portal to allow the extractable contaminant to be movable from the entrance portal and along the extraction conduit and to exit from the interior of the extraction conduit to atmosphere.

4. The method according to claim 1 including configuring the exit portal to allow the extractable contaminant to be movable from the entrance portal and along the extraction conduit and to exit from the interior of the extraction conduit into a storage system.

5. The method according to claim 1 wherein the controllable pump of the controllable contaminant-extraction system is a centrifugal pump and wherein the method includes providing a bleeding valve mounted proximate to the exit portal of the extraction conduit in which the bleeding valve is configured to introduce atmospheric air, via an air input, into an output section of the extraction conduit in such a way that the atmospheric air is bled into an input side of the centrifugal pump.

6. The method according to claim 1 including fluidly coupling the controllable contaminant-extraction system fluidly to an off-gas discharge configured to vent an off-gas flow to the atmosphere from the controllable contaminant-extraction system.

7. The method according to claim 6 including fluidly connecting an off-gas discharge valve to, and in-line with, the off-gas discharge in which the off-gas discharge valve is configured to generate back pressure in the extraction conduit to allow flow via a sampling port for off-gas sampling.

8. The method of claim 6, including providing a sampling port extending from, and fluidly coupled to, the off-gas discharge and a sampling valve fluidly connected to, and in-line with, the sampling port in which the sampling valve is configured to selectively shut OFF or turn ON fluid flow through the sampling port.

9. The method according to claim 1 wherein the controllable pump of the controllable contaminant-extraction system is a diaphragm pump.

* * * * *